(12) United States Patent
Young et al.

(10) Patent No.: US 12,204,808 B1
(45) Date of Patent: Jan. 21, 2025

(54) INTERACTIVE OBJECT DISPLAYING STRUCTURES AND METHODS OF USE

(71) Applicant: PharmaVision LLC, Northville, MI (US)

(72) Inventors: Mark Earl Young, Northville, MI (US); Mark Hyland, Mainville, OH (US)

(73) Assignee: Pharma Vision LLC, Northville, MI (US)

( * ) Notice: Subject to any disclaimer, the term of this patent is extended or adjusted under 35 U.S.C. 154(b) by 0 days.

(21) Appl. No.: 18/639,711

(22) Filed: Apr. 18, 2024

(51) Int. Cl.
*G06F 3/14* (2006.01)

(52) U.S. Cl.
CPC ........................................ *G06F 3/14* (2013.01)

(58) Field of Classification Search
CPC .......................................................... G06F 3/14
See application file for complete search history.

(56) References Cited

U.S. PATENT DOCUMENTS

| 9,361,628 B2 | 6/2016 | Stark | |
| 10,762,411 B1 * | 9/2020 | Parshin | G06Q 10/087 |
| 2013/0090996 A1 * | 4/2013 | Stark | A47F 11/06 |
| | | | 705/14.4 |

FOREIGN PATENT DOCUMENTS

| CA | 2677427 A1 | 11/2003 |
| GB | 2347296 A | 8/2000 |
| KR | 20220073909 A | 6/2022 |

* cited by examiner

*Primary Examiner* — Gustavo Polo
(74) *Attorney, Agent, or Firm* — Caldwell Intellectual Property Law

(57) ABSTRACT

An interactive object displaying structure and a method of use are disclosed. The interactive object displaying structure includes a plurality of object collecting structures configured to hold at least an object and the plurality of object collecting structures includes at least a sensor, wherein the at least a sensor is configured to detect sensor data, a plurality of display devices, wherein the plurality of display devices is configured to display at least a content, a controller communicatively connected to the at least a sensor and the plurality of display devices, wherein the controller is configured to generate the at least a content as a function of the sensor data, determine at least one display device from the plurality of display devices as a function of the sensor data and transmit the at least a content to the at least one display device.

18 Claims, 8 Drawing Sheets

INTERACTIVE OBJECT DISPLAYING STRUCTURES AND METHODS OF USE

FIELD OF THE INVENTION

The present invention generally relates to the field of display systems. In particular, the present invention is directed to interactive object displaying structures and methods of use.

BACKGROUND

Display systems may utilize digital displays to deliver multimedia contents. However, existing display systems and structures have not adequately integrated interactivity and proximity-based actions. Particularly, existing display devices do not adequately make use of increased interactivity options presented by smart devices and sensors. Existing technologies do not suffice.

SUMMARY OF THE DISCLOSURE

In an aspect, an interactive object displaying structure is disclosed. The interactive object displaying structure includes a plurality of object collecting structures, wherein the plurality of object collecting structures is configured to hold at least an object and the plurality of object collecting structures includes at least a sensor, wherein the at least a sensor is configured to detect sensor data, a plurality of display devices, wherein the plurality of display devices is configured to display at least a content, a controller communicatively connected to the at least a sensor and the plurality of display devices, wherein the controller is configured to generate the at least a content as a function of the sensor data, determine at least one display device from the plurality of display devices as a function of the sensor data and transmit the at least a content to the at least one display device.

In another aspect, a method of use of an interactive object displaying structure is disclosed. The method includes holding, using a plurality of object collecting structures, at least an object, detecting, using at least a sensor of the plurality of object collecting structures, sensor data, generating, using a controller communicatively connected to the at least a sensor, at least a content as a function of the sensor data, determining, using the controller communicatively connected to a plurality of display devices, at least one display device from the plurality of display devices as a function of the sensor data, transmitting, using the controller, the at least a content to the at least one display device and displaying, using the at least one display device, the at least a content.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an interactive object displaying structure and a method of use. The interactive object displaying structure includes a plurality of object collecting structures, wherein the plurality of object collecting structures is configured to hold at least an object and the plurality of object collecting structures includes at least a sensor, wherein the at least a sensor is configured to detect sensor data, a plurality of display devices, wherein the plurality of display devices is configured to display at least a content, a controller communicatively connected to the at least a sensor and the plurality of display devices, wherein the controller is configured to generate the at least a content as a function of the sensor data, determine at least one display device from the plurality of display devices as a function of the sensor data and transmit the at least a content to the at least one display device. Exemplary embodiments illustrating aspects of the present disclosure are described below in the context of several specific examples.

Figure 1:
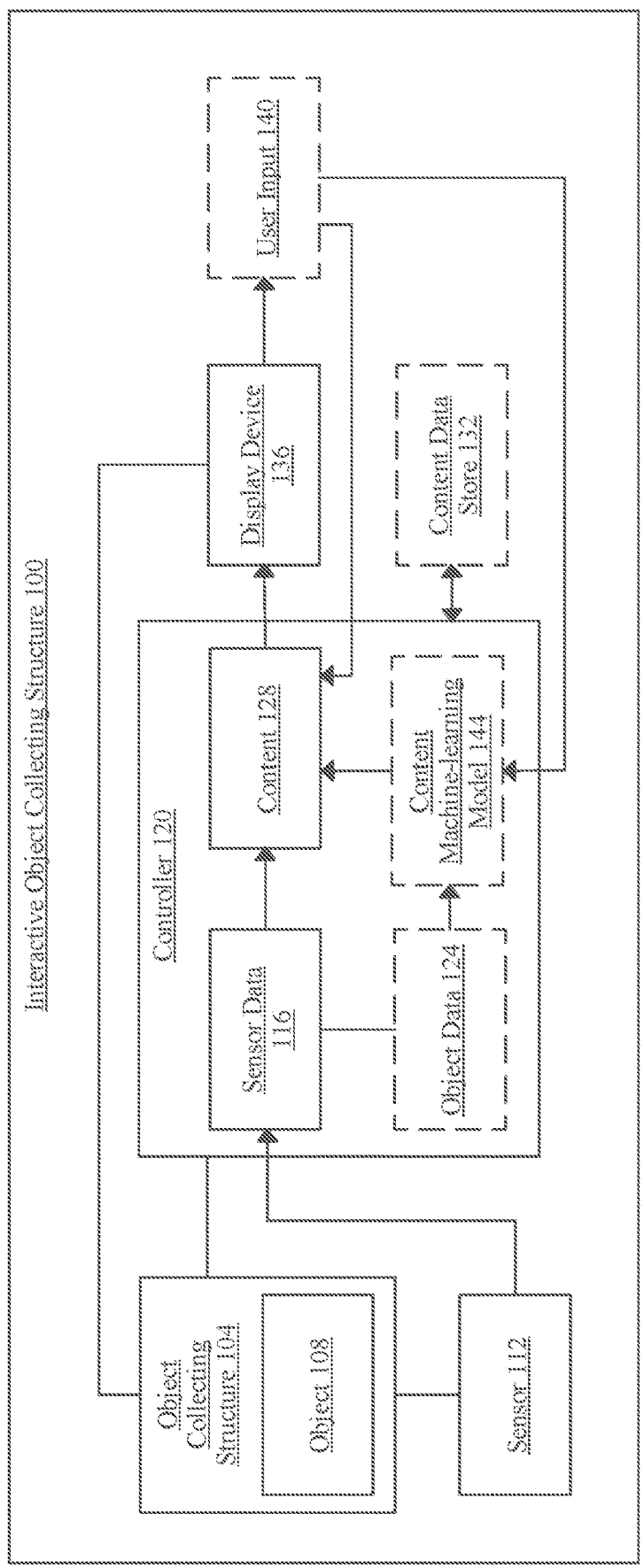
FIG. 1 illustrates a block diagram of an exemplary interactive object displaying structure.

Referring now to FIG. 1, an exemplary embodiment of an interactive object collecting structure 100 is illustrated. For the purposes of this disclosure, an "interactive object collecting structure" is a structure that interacts with a human using an object the structure holds. Interactive object collecting structure 100 includes a plurality of object collecting structures 104. For the purposes of this disclosure, an "object collecting structure" is a piece of furniture, tool, or device that is configured to hold at least an object. For the purposes of this disclosure, an "object" is any physical item or thing. In some embodiments, object 108 may include pharmaceutical products, arts, groceries, screens, books, collectibles, or any items thereof. A configuration of exemplary object collecting structure 104 is illustrated with respect to FIG. 2. As a non-limiting example, object collecting structure 104 may include containers, shelves, garment racks, rails, hanging racks, wall mounts, storages, boxes, brackets, peg hooks, or the like. As a non-limiting example, object collecting structure 104 may include wood, metal, glass, plastic, or other materials. In some embodiments, a plurality of object collecting structures 104 may include different shapes, sizes, and styles to suit different purposes and aesthetics. In some embodiments, object collecting structure 104 may be stackable, attachable, detachable, extendable, retractable, or the like. In a non-limiting example, a plurality of object collecting structures 104 may be stacked in tandem. In another non-limiting example, one object collecting structure 104 may be hidden inside or behind another object collecting structure 104. In some embodiments, a plurality of object collecting structures 104 may be stacked or formed to include various sides so that the plurality of object collecting structures 104 can collect, store and display object 108 from the various sides. As a non-limiting example, a plurality of object collecting structures 104 may be stacked or formed to include four sides facing different directions. In some embodiments, object collecting structures 104 may include a locking mechanism. In some embodiments, locking mechanism may be configured to securely store object 108 on object collecting structure 104, preventing unauthorized access or tampering. As a non-limiting example, locking mechanism may include a key lock, electronic lock, combination lock, peg lock, or the like. In some embodiments, locking mechanism may be on a peg hook, cabinet door of object collecting structure 104, or the like.

With continued reference to FIG. 1, in some embodiments, a plurality of object collecting structures 104 may be stacked or attached using an attachment mechanism. In some embodiments, attachment mechanism may include permanent attachment or removable attachment. In some embodiments, permanent attachment may include a variety of techniques, such as but not limited to welding, soldering, brazing, adhesive bonding, or the like. For the purposes of this disclosure, "removable attachment" refers to an ability for an object that is connected to another object to be disconnected from the other object without damaging or breaking said objects. In some embodiments, removable attachment may include threaded connection. For the purposes of this disclosure, "threaded connection" is a type of connection that involves mating male and female halves together to create a connection to hold the threads together. As a non-limiting example, the threaded connection may be done by way of gendered mating components. As a non-limiting example, the gendered mating components may include a male component or plug which is inserted within a female component or socket. In some cases, the threaded connection may be removable. In some cases, the threaded connection may be removable, but requires a specialized tool or key for removal. In some embodiments, the threaded connection may be achieved by way of one or more of plug and socket mates, pogo pin contact, crown spring mates, and the like. In some cases, the threaded connection may be keyed to ensure proper alignment of a mating component. In some cases, the threaded connection may be lockable. As used in this disclosure, a "mating component" is a component that mates with at least another component. As a non-limiting example, the mating component may include a connector. In another embodiment, removable attachment may include bayonet connections. The bayonet connections use a locking mechanism that allows the two components to be connected by inserting and twisting them into place. In another embodiment, removable attachment may include snap-fit connections. In some embodiments, the snap-fit connections may include a series of tabs or hooks that snap into place when the two components are pushed together. As a non-limiting example, the snap-fit connections may include snap-fit clips, snap-fit tabs, snap-fit hinges, snap-fit latches, snap-fit hooks, snap-fit pins, and the like. In another embodiment, removable attachment may include latch connections. The latch connections use a latch or locking mechanism that secures the two components together. As a non-limiting example, the latch connections may include cabinet latches, door latches, aircraft fasteners, and the like. In another embodiment, removable attachment may include clamp connections. In some embodiments, the clamp connections use a clamp or compression mechanism to hold the two components together. As a non-limiting example, the clamp connections may include hose clamps, c-clamps, pipe clamps, wire rope clamps, shaft collars, spring clamps, and the like. In another embodiment, removable attachment may include magnetic connections. In some embodiments, the magnetic connections use magnets to hold the two components together. In some embodiments, removable attachment may include connectors, screws, adapters, feedthrough, and the like. For the purposes of this disclosure, a "connector" is a component configured to create an electrical or mechanical connection between two or more objects. Examples of connectors include plug and socket connectors, terminal blocks, crimp connectors, and the like. As a non-limiting example, removable attachment may include mechanical fasteners. For example, and without limitation, mechanical fasteners may include bolts, screws, nuts, washers, rivets, pins, and the like. In some embodiments, a plurality of object collecting structures 104 may be manufactured as a whole unit.

With continued reference to FIG. 1, object collecting structure 104 includes at least a sensor 112. For the purposes of this disclosure, a "sensor" is a device that produces an output signal for the purpose of sensing a physical phenomenon. In some embodiments, sensor 112 may be configured to transduce a detected phenomenon, such as without limitation, temperature, pressure, motion, light, and the like, into a sensed signal. In some embodiments, sensor 112 may output the sensed signal (i.e., sensor data 116). In some embodiments, sensor 112 may include a plurality of sensors. As a non-limiting example, object collecting structure 104 may include different types of sensors 112; for instance, pressure sensor, motion sensor, light sensor, optical sensor, or the like. As described in this disclosure, an "optical sensor" is a device that is configured to detect an optical phenomena. Exemplary non-limiting optical sensors include photodetectors, photodiodes, pyrometers, cameras, image sensors (e.g., CMOS and CCD), and the like. As another non-limiting example, optical sensor may include camera. In a non-limiting example, optical sensor may be configured to generate image data, wherein the image data includes image or video of a user or object 108. As another non-limiting example, object collecting structure 104 may include same type of sensors 112; for instance, object collecting structure 104 may include a plurality of pressure sensors. In some embodiments, sensor 112 may be attached on object collecting structure 104. As a non-limiting example, sensor 112 may be attached on a surface of object collecting structure 104 where object 108 is placed on to be displayed. As another non-limiting example, sensor 112 may be attached on a surface of a side of object collecting structure 104 facing front. In some embodiments, sensor 112 may be incorporated in controller 120. In some embodiments, sensor 112 may be remote from controller 120.

With continued reference to FIG. 1, sensor 112 is configured to output sensor data 116. For the purposes of this disclosure, "sensor data" is data that is output from a sensor. Sensor 112 may include any computing device as described in the entirety of this disclosure and configured to convert and/or translate a plurality of signals detected into electrical signals for further analysis and/or manipulation. In some embodiments, sensor data 116 may include data from NFC or RFID reader. In some embodiments, controller 120 may be configured to identify object unique identifier and retrieve object data 124 as a function of the object unique identifier. In some embodiments, controller 120 may determine content 128 as a function of object data 124. In a non-limiting example, controller 120 may determine or generate content 128 that is related to object data 124. For example, and without limitation, if object data 124 includes type of object 108 as consumable or pharmaceutical product, controller 120 may determine content 128 that includes a video that explains how to consume object 108. For the purposes of this disclosure, "object data" is information related to an object. As a non-limiting example, object data 124 may include types of object 108, name, price, manufacturer information, object unique identifier, weight, volume, location or position at object collecting structure 104, or the like. In some embodiments, object data 124 may be stored in content data store 132. In some embodiments, object data 124 may be retrieved from content data store 132. In some embodiments, user may manually input object data 124.

With continued reference to FIG. 1, for the purposes of this disclosure, an "object unique identifier" is an identifier that is unique for an object among others. In some embodiments, keyword may include object unique identifier. In a non-limiting example, controller 120 may query content data store 132 as a function of object unique identifier. As a non-limiting example, object unique identifier may include a universal product code (barcode), cryptographic hashes, primary key, a unique sequencing of alpha-numeric symbols, or anything of the like that can be used to identify object 108. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like. Object unique identifier may take the form of any identifier that uniquely corresponds to the purposes of system 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate.

With continued reference to FIG. 1, in some embodiments, sensor data 116 may include proximity datum. For the purposes of this disclosure, "proximity datum" is the element of data that is related to a proximity between a sensor and a human or external devices. In a non-limiting example, sensor 112 may detect proximity datum when a user is close to object collecting structure 104 (i.e. a user is within a predetermined proximity range). In another non-limiting example, sensor 112 may detect proximity datum when a user enters or walks into a building, room, or the like that object collecting structure 104 is located in. In some embodiments, proximity datum may include a proximity signal. In a non-limiting example, proximity signal may be indicative of user display device is within a predetermined range from sensor 112 or controller 120. In some cases, a proximity signal may include an analog signal, a digital signal, an electrical signal, an optical signal, a fluidic signal, radio signal, or the like. In a non-limiting example, sensor 112 that includes NFC reader detects a signal from user display device, this may indicate that user display device is within a predetermined proximity range of sensor 112 or user display device is within a predetermined proximity range of sensor 112. For example, and without limitation, an NFC reader sends out a radio frequency signal and when a user display device detects the radio frequency signal from the NFC reader and establishes communication with the NFC reader; once the communication is established between the NFC reader and the user display device, controller 120 may receive user data (e.g., sensor data 112) from the user display device, which indicates that the user display device is within a predetermined proximity range of the NFC reader (e.g., proximity datum), meaning that the user display device is located proximate to object collecting structure 104 where the NFC reader (e.g., sensor 112) installed. Therefore, continuing the non-limiting example, controller 120 may determine a user display device proximity as a function of sensor data 112 (e.g., proximity datum). For the purposes of this disclosure, a "user display device proximity" is the closeness or nearness between an interactive object collecting structure 100 and a user display device. In some embodiments, user proximity may be determined based on a signal strength. In a non-limiting example, user display device proximity may be Boolean; for example, and without limitation, user display device proximity may include proximate or not proximate.

With continued reference to FIG. 1, for the purposes of this disclosure, a "predetermined proximity range" is a range of distance between a sensor and a human or external device that the sensor can detect proximity datum. As a non-limiting example, predetermined proximity range may include any distances thereof; for instance, but not limited to, 5 millimeters, 4 centimeters, 10 centimeters, 30 centimeters, or the like. In some embodiments, predetermined proximity range may be manually determined by a user. In a non-limiting example, user may input predetermined proximity range using user display device. In another non-limiting example, user data may include predetermined proximity range. In some embodiments, previously used predetermined proximity range may be used. In a non-limiting example, previously used predetermined proximity range may be stored in a content data store 132. In a non-limiting example, when sensor 112 that includes NFC reader detects a signal (e.g. proximity datum) from user display device, controller 120 may determine content 128 and transmit to display device 136 to display content 128. Continuing the non-limiting example, sensor 112 that includes NFC reader may no longer detect a signal (e.g. proximity datum) from user display device; this may indicate that user display device is far from sensor 112, then controller 120 may stop transmitting content 128 to display device 136 to display content 128. As a non-limiting example, sensor 112 that detects proximity datum may include a capacitive sensor, capacitive displacement sensor, doppler effect sensor, inductive sensor, magnetic sensor, optical sensor (such as without limitation a photoelectric sensor, a photocell, a laser rangefinder, a passive charge-coupled device, a passive thermal infrared sensor, and the like), radar sensor, reflection sensor, sonar sensor, ultrasonic sensor, fiber optics sensor, Hall effect sensor, and the like. As another non-limiting example, sensor 112 that detects proximity datum may include a near-field communication (NFC) reader.

With continued reference to FIG. 1, as used in this disclosure, an "NFC reader" is a device that allows two-way communication between electronic devices. As a non-limiting example, NFC reader may allow two-way communication between NFC enabled user display device and controller 120 that receives proximity datum from NFC reader. NFC reader may support a plurality of radio-frequency (RF) protocols such as, without limitation, Zigbee, Bluetooth Low Energy (BLE), Wi-Fi, and the like thereof. In a non-limiting example, NFC reader may include RFID (radio-frequency identification) reader. As used in this disclosure, a "near-field communication" is a technology that allows NFC enabled device to execute a plurality of communication protocols, thereby enabling a communication between NFC enabled device and an external device. In some embodiments, sensor 112 may include BLE beacon. For the purposes of this disclosure, a "BLE beacon" is a device that uses Bluetooth to broadcast signals to nearby devices. In a non-limiting example, BLE beacon may transmit content 128 to display device 136. In some embodiments, BLE beacon may include a predetermined proximity range. The predetermined proximity range is described in this disclosure.

With continued reference to FIG. 1, in some embodiments, sensor data 116 may include object absence datum. For the purposes of this disclosure, "object absence datum" is the element of data that is related to the change in the position of an object on an object collecting structure. In some embodiments, sensor 112 that detects object absence datum may include infrared sensor, pressure sensor, weight sensor, light sensor, or the like. In a non-limiting example, sensor 112 may detect object absence datum when object 108 is picked up from object collecting structure 104. In some embodiments, controller 120 may be configured to determine an absence of object 108 as a function of object absence datum. For the purposes of this disclosure, an "absence" of object 108 refers to the state where an object is not present in a certain location, In a non-limiting example, absence of object 108 may be the state where object 108 is not on object collecting structure 104 or sensor 112 installed on object collecting structure 104. For example, and without limitation, when object 108 is picked up from object collecting structure 104 or sensor 112 of object collecting structure 104, controller 120 may receive sensor data 116 (e.g., object absence datum) from the sensor 112 and determine absence of object 108 as a function of the sensor data 116. In some embodiments, object absence datum may be stored in content data store 132. In some embodiments, object absence datum may be retrieved from content data store 132.

With continued reference to FIG. 1, interactive object collecting structure 100 includes a plurality of display devices 136. For the purposes of this disclosure, a "display device" is a device that is configured to display content. In some embodiments, display device 136 may be configured to display content 128. Content 128 disclosed herein is further described below. As a non-limiting example, display device 136 may present visual information or data in one or more forms of text, graphics, images, video, and the like. Display device 136 may be configured to provide a way for a user to view and/or interact with information. In some embodiments, display device 136 may include different technologies, such as liquid crystal display (LCD), a light-emitting diode (LED), organic light-emitting diode (OLED), plasma, projection, touch screen, and/or the like. In some embodiments, display device 136 may include varying resolutions, sizes, and aspect ratios. In some embodiments, display device 136 may be attached on object collecting structure 104. In some embodiments, display device 136 may be extended from object collecting structure 104 using bracket, or the like. In some embodiments, object collecting structure 104 may include one display device 136 on each side of object collecting structure 104. In some embodiments, object collecting structure 104 may include one display device 136. In some embodiments, object collecting structure 104 may include a plurality of display device 136. In some embodiments, display device 136 may be remote from object collecting structure 104. In some embodiments, display device 136 may include an interface that a user can input data. In some embodiments, display device 136 may include speaker, microphone, or the like. In some cases, display device 136 may be plugged into a wall outlet. In some embodiments, display device 136 a charging station so that the at least a display can maneuver easily around a marketplace floor. In some embodiments, display device 136 may include a projector. For the purposes of this disclosure, a "projector" is a device that projects light onto a surface. In a non-limiting example, display device 136 (e.g., projector) may be configured to project light onto ground to display content 128. In another non-limiting example, display device 136 (e.g., projector) may project light onto a user's body to display content 128. In another non-limiting example, display device 136 (e.g., projector) may project light onto object 108, object collecting structure 104, or the like.

With continued reference to FIG. 1, in some embodiments, display device 136 may include a user display device. For the purposes of this disclosure, a "user display device" is any device that a user uses to input data. As a non-limiting example, user display device may include a laptop, desktop, tablet, mobile phone, smart phone, smart watch, smart headset, or things of the like. In some embodiments, user display device may include an interface configured to receive inputs from user. In some embodiments, user may manually input any data into apparatus 100 using user display device. In some embodiments, user display device may have a capability to process, store or transmit any information independently. In some embodiments, display device 136 may include a structure display device. For the purposes of this disclosure, a "structure display device" is any device that is installed on an object collecting structure. In a non-limiting example, structure display device may include a screen, tablet, or the like. In some embodiments, structure display device may include an interface configured to receive inputs from user. In some embodiments, user may manually input any data into apparatus 100 using structure display device. In some embodiments, structure display device may have a capability to process, store or transmit any information independently.

With continued reference to FIG. 1, in some embodiments, display device 136 may incorporate a chatbot system. For the purposes of this disclosure, "chatbot" is an artificial intelligence (AI) program designed to simulate human conversation or interaction through text, voice-based or image-based communication. In some embodiments, display device 136 may receive object data 124, user data or user input 140 from chatbot. Chatbot system described herein is further described with respect to FIG. 3.

With continued reference to FIG. 1, interactive object collecting structure 100 includes a controller 120. In some embodiments, controller 120 may include at least a processor. Controller 120 may include, without limitation, any processor described in this disclosure. Controller 120 may be included in a computing device. Controller 120 may include any computing device as described in this disclosure, including without limitation a microcontroller, microprocessor, digital signal processor (DSP) and/or system on a chip (SoC) as described in this disclosure. Controller 120 may include, be included in, and/or communicate with a mobile device such as a mobile telephone or smartphone. Controller 120 may include a single computing device operating independently, or may include two or more computing device operating in concert, in parallel, sequentially or the like; two or more computing devices may be included together in a single computing device or in two or more computing devices. Controller 120 may interface or communicate with one or more additional devices as described below in further detail via a network interface device. Network interface device may be utilized for connecting controller 120 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 120 may include but is not limited to, for example, a computing device or cluster of computing devices in a first location and a second computing device or cluster of computing devices in a second location. Controller 120 may include one or more computing devices dedicated to data storage, security, distribution of traffic for load balancing, and the like. Controller 120 may distribute one or more computing tasks as described below across a plurality of computing devices of computing device, which may operate in parallel, in series, redundantly, or in any other manner used for distribution of tasks or memory between computing devices. Controller 120 may be implemented, as a non-limiting example, using a "shared nothing" architecture.

With continued reference to FIG. 1, controller 120 may be designed and/or configured to perform any method, method step, or sequence of method steps in any embodiment described in this disclosure, in any order and with any degree of repetition. For instance, controller 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 120 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, interactive object collecting structure 100 may include a memory communicatively connected to controller 120. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, controller 120 is communicatively collected to sensor 112 and display device 136. In some embodiments, controller 120 may be configured to receive sensor data 116 from sensor 112. In a non-limiting example, controller 120 may receive proximity datum, object absence datum, or the like. Controller 120 is configured to generate at least a content 128 as a function of sensor data 116. For the purposes of this disclosure, "content" is displayable material that provides information or data to a user. As a non-limiting example, content 128 may include text, images, audio, video, and other forms of data. As a non-limiting example, content 128 may include advertisement, commercial, logo, tutorial, report, informative content, animation, marketing campaign, or the like. As another non-limiting example, content 128 may include information related to discounts or deals. In a non-limiting example, content 128 may include advertisement of an object 108 that is picked up by a user from object collecting structure 104. In another non-limiting example, content 128 may include instruction of how to consume or use object 108 that is picked up by a user from object collecting structure 104. In another non-limiting example, content 128 may include logo of a brand of object 108 that is picked up by a user from object collecting structure 104. In another non-limiting example, content 128 may include a video or animation and audio that welcomes a user who gets in a store where object collecting structure 104 is or a user who gets close to object collecting structure 104 within predetermined proximity range. In another non-limiting example, content 128 may include text that informs a user about any discounts or sales. In another non-limiting example, content 128 may include image or video of a user and any visual elements (e.g., image, icon, text, video, animation, or the like) placed over the image or video of the user. Persons skilled in the art, upon reviewing the entirety of this disclosure, may appreciate various contents 128 that can be displayed to user.

With continued reference to FIG. 1, in some embodiments, content 128 may be stored in content data store 132. In some embodiments, content 128 may be retrieved from content data store 132. In some embodiments, user may manually determine or generate content 128. As used in this disclosure, "content data store" is a data structure configured to store data associated with user. As a non-limiting example, content data store 132 may store content 128, predetermined proximity range, user data, sensor data 116, proximity datum, object absence datum, image data, user input 140, and the like. In one or more embodiments, content data store 132 may include inputted or calculated information and datum related to content 128. In some embodiments, a datum history may be stored in content data store 132. As a non-limiting example, the datum history may include real-time and/or previous inputted data related to content 128. As a non-limiting example, content data store 132 may include instructions from a user, who may be an expert user, a past user in embodiments disclosed herein, or the like, where the instructions may include examples of the data related to content 128.

With continued reference to FIG. 1, in some embodiments, controller 120 may be communicatively connected with content data store 132. For example, and without limitation, in some cases, content data store 132 may be local to controller 120. In another example, and without limitation, content data store 132 may be remote to controller 120 and communicative with controller 120 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure controller 120 connect directly, dynamically, and non-hierarchically to as many other computing devices as possible. A "network topology" as used in this disclosure is an arrangement of elements of a communication network. The network may use an immutable sequential listing to securely store content data store 132. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, content data store 132 may include keywords. In some embodiments, controller 120 or user may query content data store 132 for certain information using keyword. As used in this disclosure, a "keyword" is an element of word or syntax used to identify and/or match elements to each other. For example, without limitation, keyword may include a "name of a product" in the instance that a user is looking for information or content 128 related to a specific product. In another non-limiting example, keyword may include a "name of a user" in an example where a user is looking for information or content 128 related to a specific user.

With continued reference to FIG. 1, in some embodiments, content data store 132 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, controller 120 may be configured to receive or retrieve user data. For the purposes of this disclosure, "user data" is data related to a user. As a non-limiting example, user data may include user's demographic information, user preference related to content 128, or the like. As a non-limiting example, user's demographic information may include age, gender, occupation, residence, family information, medical history, medical prescription information, or the like. For the purposes of this disclosure, a "user" is any person or individual that is using or has used an interactive object collecting structure 100. As a non-limiting example, user may include a customer, client, visitor, audience, and the like. For the purposes of this disclosure, "user preference" related to a content refers to an attribute of a content to which a user has more personal inclination towards over other attributes of the content. As a non-limiting example, user preference related to content 128 may include types of contents 128, formats of contents 128, accepting or rejecting contents 128 to be displayed on user display device or structure display device, or the like. In some embodiments, user data may be stored in content data store 132. In some embodiments, user data may be retrieved from content data store 132. In some embodiments, controller 120 may receive user data from user display device. In some embodiments, user may manually input user data. In some embodiments, controller 120 may receive user data using sensor 112. As a non-limiting example, controller 120 may receive user data through data transfer (sensor data 116) between NFC reader (sensor 112) and user display device. In some embodiments, controller 120 may generate or determine content 128 as a function of user data as described further in detail below. As a non-limiting example, controller 120 may generate or determine format or type of content 128 as a function of user preference of user data. As another non-limiting example, controller 120 may generate or determine content 128 as a function of user's demographic information.

With continued reference to FIG. 1, controller 120 is configured to generate content 128 as a function of sensor data 116. In a non-limiting example, if sensor data 116 includes object absence datum related to a particular object 108, controller 120 may generate content 128 that includes information related to the particular object 108. In another non-limiting example, if sensor data 116 includes proximity datum, controller 120 may generate content 128 that includes video that welcomes a user to a building. In some embodiments, controller 120 may determine or generate content 128 as a function of sensor data 116 according to a plurality of rules using a rule-based engine. As used in this disclosure, a "rule engine," as described herein, refers to a computational system that uses a set of predefined rules (or criteria) to make decisions based on input data, wherein each "rule" within the set of rules, for the purpose of this disclosure, is a specific criterion or condition that dictates a particular aspect of content selection. For example, and without limitation, a rule may state that 'if the sensor data 116 includes object absence datum related to a particular object 108, then select contents 128 that includes video are related to the particular object 108.' Upon a rule's condition are met, rule engine may take corresponding action dictated by the rule, which may include, without limitation, selecting a particular type of content, selecting at least one display device 136 from a plurality of display device 136, or the like. Rule engine may be configured to iteratively evaluate sensor data 116 and/or use data to determine content 128. In some cases, set of predefined rules may be based on user preference, user data, functional needs, or any combination thereof. Additionally, or alternatively, one or more machine learning processes as described in further detail below may be employed for content selection, for example, and without limitation, one or more machine learning models may be generated using training data containing exemplary sensor data and/or exemplary user data as input correlated to a plurality of exemplary contents as output. Controller 120 may determine, using the trained machine learning models, content 128 based on received sensor data 116 and/or user data. In some embodiments, user may manually determine or generate content 128.

With continued reference to FIG. 1, in some embodiments, controller 120 may determine or generate content 128 as a function of image data (e.g., sensor data 116) from optical sensor (e.g., sensor 112). As a non-limiting example, content 128 may include image or video of object 108 or any visual elements (e.g., image, icon, text, video, animation, or the like) placed over or superimposed to an image or video (e.g., image data) of the user. For the purposes of this disclosure, "superimposing" content refers to the process of overlaying a content onto an image. In a non-limiting example, controller 120 may superimpose text, icon, image, video or animation related to user or object 108 on image data to generate content 128 to generate content 128. In some embodiments, controller 120 may determine content 128 as a function of label determined from image data. As a non-limiting example, if a label includes any feature of user (e.g., age, gender, clothing style, height, or the like), controller 120 may determine content 128 that is related the feature of user. In some embodiments, this may be used to iteratively update content training data and train content machine-learning model 144 using the updated content training data to generate content 128.

With continued reference to FIG. 1, in some embodiments, controller 120 may analyze image data using a machine vision system to identify a user or object 108 in image data and superimpose content 128 to the image data. For the purposes of this disclosure, a "machine vision system" is a type of technology that enables a computing device to inspect, evaluate and identify still or moving images. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (e.g., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, alternatively or additionally, identifying a user or object 108 in image data may include classifying a user or object 108 in image data to a label of a user or object 108 using an image classifier; the image classifier may be trained using a plurality of images of users (e.g., humans) or objects 108. The image classifier may be configured to determine which of a plurality of edge-detected shapes is closest to an attribute set of users (e.g., humans) or objects 108 as determined by training using training data and selecting the determined shape as the user or object 108. As a non-limiting example, the image classifier may be trained with image training data that correlates the plurality of images of users or objects 108 to a label of the users or objects 108. For example and without limitation, the image training data may correlate a plurality of images of human to a label of 'human,' 'male' or 'female.' Alternatively, identification of the user or object 108 may be performed without using machine vision and/or classification; for instance, identifying the user or object 108 may further include receiving, from a user, an identification of the user or object 108 in image data.

With continued reference to FIG. 1, in some cases, a machine vision system may use a classifier, such as any classifier described throughout this disclosure. As a non-limiting example, the machine vision system may use an image classifier. For example and without limitation, the machine vision system may use the image classifier, wherein an input may include the image data that is analyzed to find the user or object 108, and through a classification algorithm, outputs the user or object 108 with a label of the user or object 108 based on image training data. For the purposes of this disclosure, "image training data" is training data that is used to train an image classifier. The image training data disclosed herein may be consistent with any training data disclosed in the entirety of this disclosure. In an embodiment, the image training data may correlate the image data that may be analyzed to find user or object 108 to a label of the user or object 108.

With continued reference to FIG. 1, in some embodiments, controller 120 may be configured to determine content 128 as a function of sensor data 116 and user data by the use of machine-learning module. Machine-learning module disclosed herein is further described with respect to FIG. 4. In some cases, controller 120 may be configured to generate content training data. As a non-limiting example, content training data may include correlations between exemplary user data, exemplary sensor data, exemplary object data 124, exemplary content, or the like. For example, and without limitation, content training data may include object unique identifier of object 108 correlated to a content related to the object 108. In some embodiments, content training data may be stored in content data store 132. In some embodiments, content training data may be received from one or more users, content data store 132, external computing devices, and/or previous iterations of processing. As a non-limiting example, content training data may include instructions from a user, who may be an expert user, a past user in embodiments disclosed herein, or the like, which may be stored in memory and/or stored in content data store 132, where the instructions may include labeling of training examples. In some embodiments, content training data may be updated iteratively on a feedback loop. As a non-limiting example, controller 120 may update content training data iteratively on a feedback loop as a function of newly collected sensor data 116, object data 124, user data, user input 140, output of any machine-learning models (e.g. content machine-learning model 144), or the like. In some embodiments, controller 120 may be configured to generate content machine-learning model 144. In a non-limiting example, generating content machine-learning model 144 may include training, retraining, or fine-tuning content machine-learning model 144 using content training data or updated content training data. In a non-limiting example, content machine-learning model 144 may include supervised learning algorithms; for instance, without limitation, decision trees, support vector machines, neural networks, or the like. In another non-limiting example, content machine-learning model 144 may include unsupervised learning algorithms; for instance, without limitation, clustering algorithms, density-based methods, or the like. In some embodiments, controller 120 may be configured to determine content 128 using content machine-learning model 144 (e.g., trained or updated content machine-learning model 144). In some embodiments, generating training data and training machine-learning models may be simultaneous.

With continued reference to FIG. 1, in some embodiments, controller 120 may be configured to determine content 128 by querying content data store 132. In some embodiments, controller 120 may query content 128 using keywords in content data store 132 for appropriate content 128. In a non-limiting example, controller 120 may query content data store 132 using user data, object data 124, or the like. In some embodiments, controller 120 may be configured to determine content 128 using a content lookup table. For the purposes of this disclosure, a "content lookup table" is a lookup table that determines content as a function of inputs. In some embodiments, controller 120 may 'lookup' given user data, sensor data 116, or any inputs to find corresponding content 128. In a non-limiting example, controller 120 may 'lookup' given keywords to find corresponding content 128. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, controller 120 is configured to determine at least one display device 136 from a plurality of display devices 136 as a function of sensor data 116. Controller 120 is configured to transmit content 128 to the at least one display device 136. In a non-limiting example, if sensor data 116 includes proximity datum related to a first user display device, then controller 120 may determine the first user display device (e.g., at least one display device 136) from a plurality of display devices 136 including a plurality of structure display devices and a plurality of user display devices and transmit content 128 to the first user display device. In another non-limiting example, if sensor data 116 includes proximity datum related to a first user display device, then controller 120 may determine the first user display device and a structure display device that is facing a building's entrance, where a user or the first user display entered from a plurality of display devices 136 including a plurality of structure display devices and a plurality of user display devices and transmit content 128 to the first user display device and the structure display device. In another non-limiting example, if sensor data 116 includes object absence datum, then controller 120 may determine a structure display device from a plurality of display devices 136. In some embodiments, a user may manually determine at least one display device 136 from a plurality of display devices 136. Persons skilled in the art, upon reviewing the entirety of this disclosure, may appreciate various ways to determine at least one display device 136 from a plurality of display devices 136.

With continued reference to FIG. 1, in some embodiments, controller 120 may receive a user input 140 from display device 136. In a non-limiting example, controller 120 may receive user input 140 from at least one display device 136 determined from a plurality of display devices 136 to display content 128. In another non-limiting example, controller 120 may receive user input 140 that is other display devices 136 that was not determined from a plurality of display devices 136 to display content 128. For the purposes of this disclosure, a "user input" is any input a user inputted into a display device. As a non-limiting example, user input 140 may include a click rate on content 128 displayed on display device 136, usage rate of content 128 (e.g. discounts, deals, or the like), rating of content 128, streaming rate of content 128, or the like. In some embodiments, user input 140 may be stored in content data store 132. In some embodiments, user may be retrieved from content data store 132. In some embodiments, controller 120 may update content training data as a function of newly collected user input 140 and generate or fine-tune content 128 using a content machine-learning model 144 trained with the updated training data. In a non-limiting example, updating content 128 using user input 140 may allow to personalize content 128 for a user.

With continued reference to FIG. 1, in some embodiments, controller 120 may be further configured to generate a user interface displaying content 128. In some embodiments, controller 120 may display image data and content 128 over the image data and controller 120 may generate user interface that a user can interact or manipulate with displayed image data or displayed content 128. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to controller 120. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs, or the like because clicking on them yields instant access.

Figure 2:
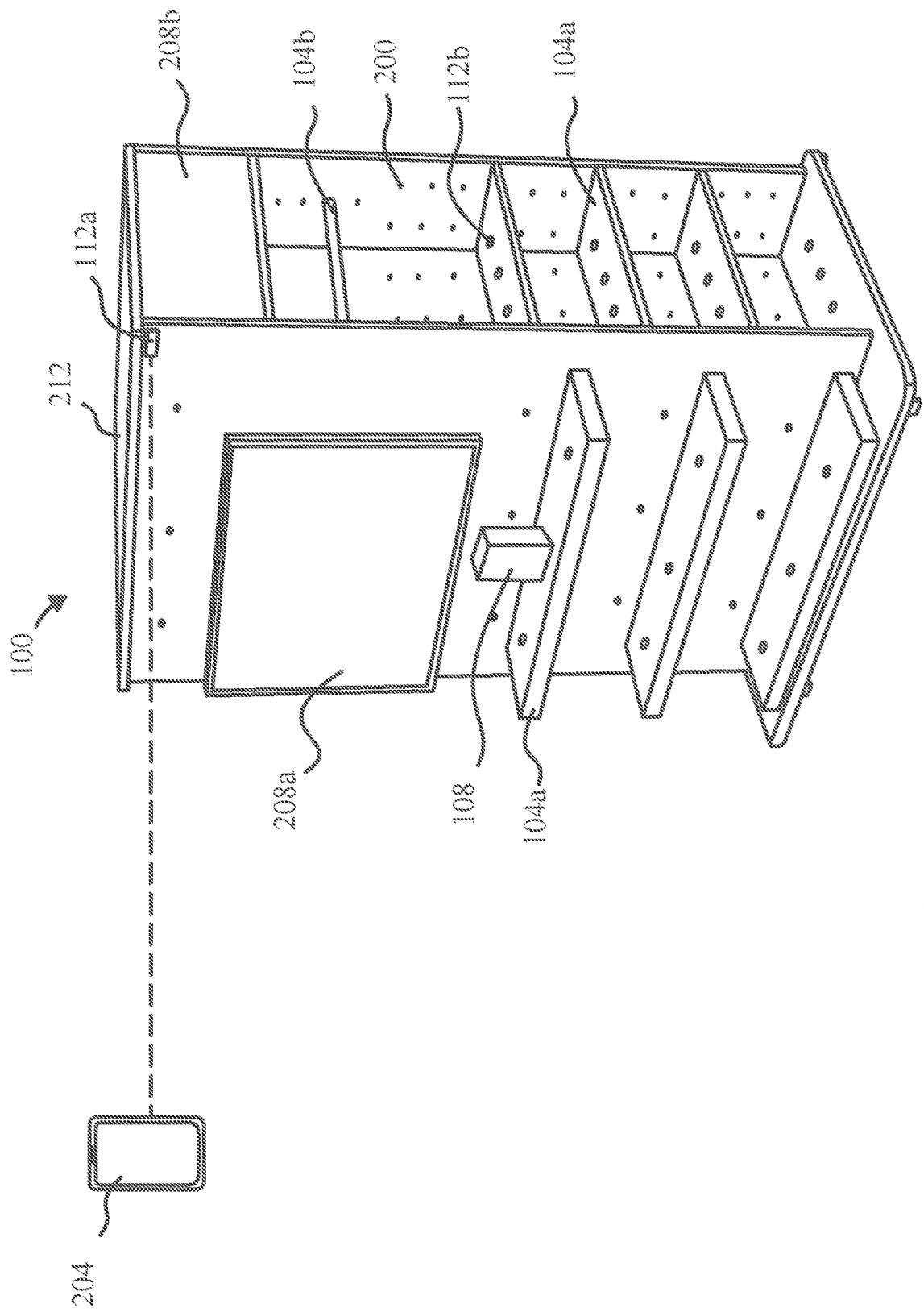
FIG. 2 illustrates a configuration of exemplary interactive object collecting structure.

Referring now to FIG. 2, a configuration of exemplary interactive object collecting structure 100 and exemplary display devices 136 is illustrated. Object collecting structure 104 is configured to hold at least an object 108. As a non-limiting example, object collecting structure 104 may include containers, shelves 104a, garment racks 104b, rails, hanging racks, wall mounts, storages, boxes, brackets, peg hooks, or the like. As a non-limiting example, object collecting structure 104 may include wood, metal, glass, plastic, or other materials. In some embodiments, a plurality of object collecting structures 104 may include different shapes, sizes, and styles to suit different purposes and aesthetics. In some embodiments, object collecting structure 104 may be stackable, attachable, detachable, extendable, retractable, or the like. In some embodiments, interactive object collecting structure 100 and/or object collecting structure 104 may include a hole 200, which allows to attach, detach, remove, replace, move up or down, or the like an object collecting structure 104 (e.g. shelves 104a, garment racks 104b, or the like) using the hole 200. In another non-limiting example, object collecting structure 104 may be stacked in various forms. In another non-limiting example, object collecting structure 104 may be attach, detach, remove, replace, move up or down, or the like using mechanical fasteners or any removable attachment connectors described in this disclosure. As a non-limiting example, object 108 may include pharmaceutical products, arts, groceries, screens, books, collectibles, or any items thereof. Object collecting structure 104 includes at least a sensor 112. In some embodiments, sensor 112 is configured to detect sensor data 116. As a non-limiting example, sensor data 116 may include image data, proximity datum, object absence datum, or any data described above. In a non-limiting example, sensor 112a may be configured to detect proximity datum related to user display device 204. In another non-limiting example, sensor 112b may be configured to detect object absence datum related to object 108. In a non-limiting example, object 108 may be placed over sensor 112b so that sensor 112b can detect object absence datum related to the object 108.

With continued reference to FIG. 2, object collecting structure 104 may include at least a structure display device 208a-b. In some embodiments, structure display device 208a and structure display device 208b may be attached on different sides of object collecting structure 104. In some embodiments, structure display device 208a and structure display device 208b may display same content 128. In some embodiments, user display device 204, structure display device 208a and structure display device 208b may display different contents 128. As a non-limiting example, structure display device 208a may display content 128 related to a user and structure display device 208b may display content 128 related to object 108 or vice versa. As another non-limiting example, structure display device 208a may display content 128 related to object 108 placed on a first side of object collecting structure 104 while structure display device 208b displays content 128 related to object on object 108 placed on a second side of object collecting structure 104.

With continued reference to FIG. 2, in some embodiments, interactive object collecting structure 100 may include a top cover 212. For the purposes of this disclosure, a "top cover" of an interactive object collecting structure 100 is a top surface or a lid of the interactive object collecting structure 100. In a non-limiting example, top cover 212 may cover and protect objects 108, computing device, wires, or the like stored within interactive object collecting structure 100 below the top cover 212. In some embodiments, top cover 212 may be removable, which allows a user access to objects 108, computing device, wires, or the like. In a non-limiting example, top cover 212 may be mounted on hinges. In a non-limiting example, top cover 212 may be opened and closed. In some embodiments, interactive object collecting structure 100 may include a door (not shown in FIG. 2). The door may allow to store, cover or protect objects 108, computing device, wires, or the like within interactive object collecting structure 100. In a non-limiting example, a user may open or close the door to manage objects 108, computing device, wires, or the like placed behind the door and within interactive object collecting structure 100. In a non-limiting example, the door may be top cover 212. For example, and without limitation, the door may be on top of interactive object collecting structure 100 as top cover 212 and may allow a user to open and close the door (e.g., top cover 212).

Figure 3:
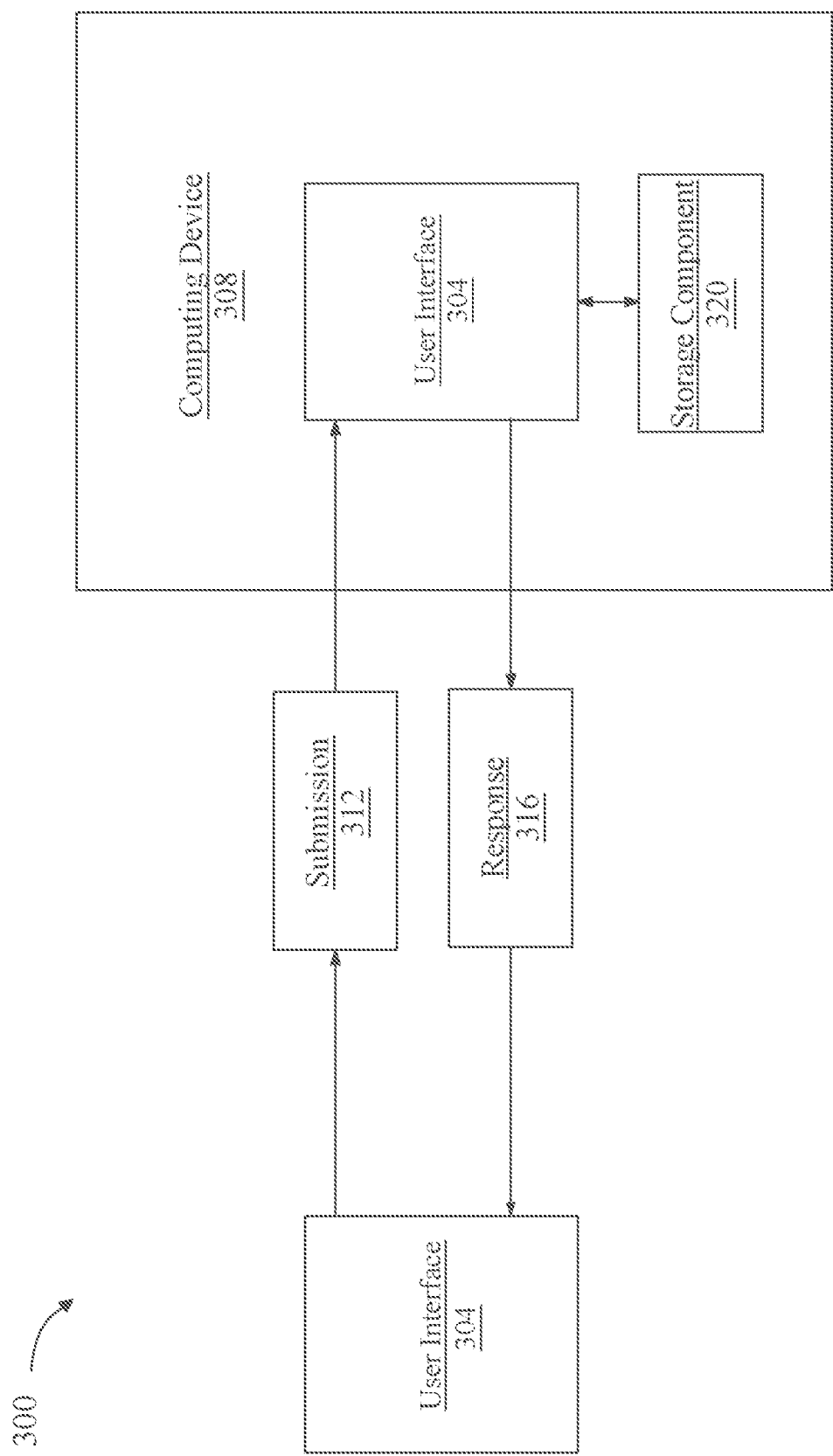
FIG. 3 illustrates a block diagram of exemplary chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user device 304 may be used by computing device 308 as an input to another function.

With continued reference to FIG. 3, a chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "chatbot input" is any response that a user inputs in to a chatbot as a response to a prompt or question.

With continuing reference to FIG. 3, computing device 308 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

Still referring to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 4:
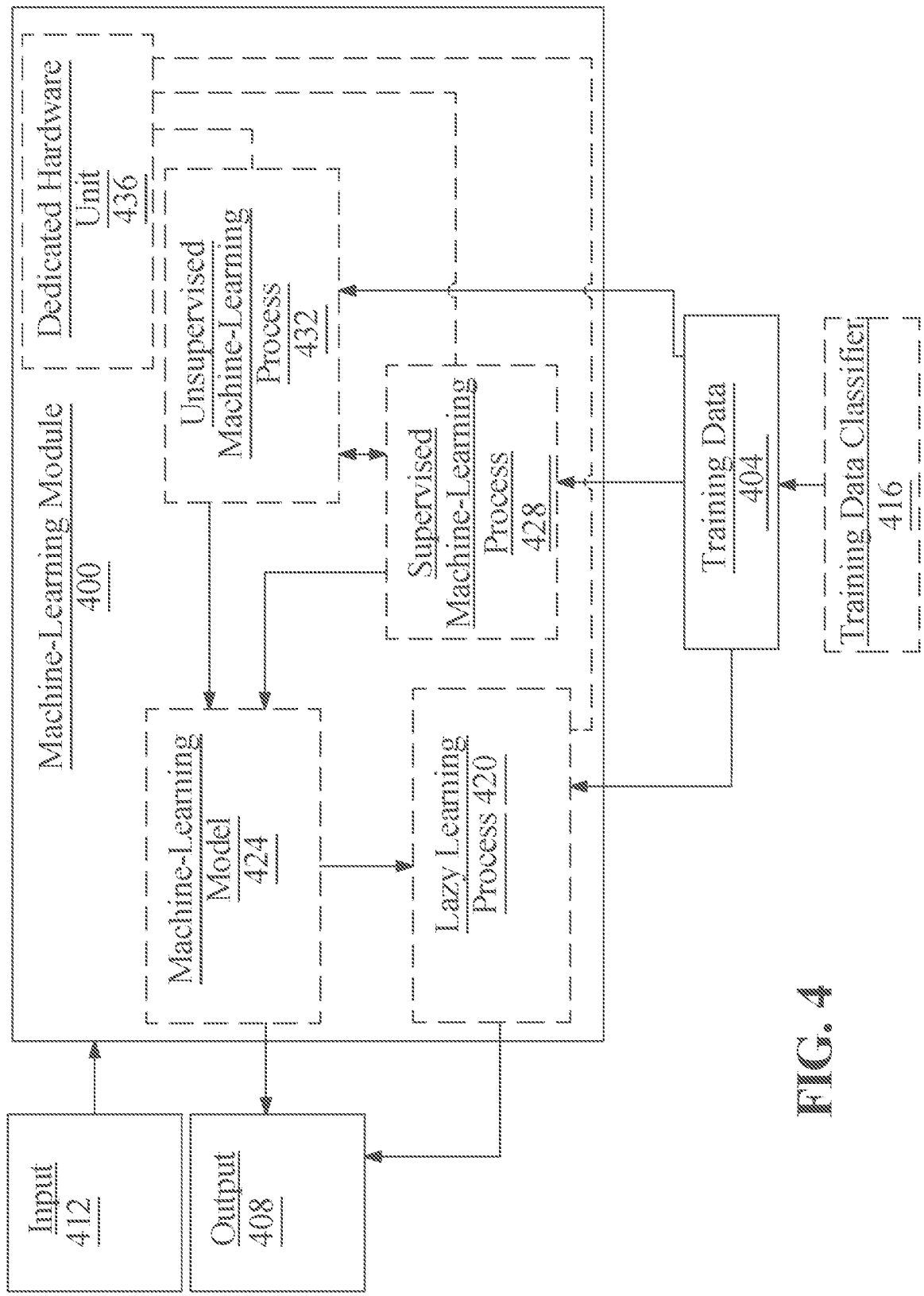
FIG. 4 illustrates a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include user data, sensor data 116, user input, or the like. As a non-limiting illustrative example, output data may include content 128.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a cohort of user or object 108, geolocation of building at where object collecting structure 104 is located, or the like. For example, and without limitation, training data classifier 416 may classify elements of training data to different age, gender, residence, occupation, family information, medical history, medical prescription, or the like of user. For example, and without limitation, training data classifier 416 may classify elements of training data to different types of objects 108.

Still referring to FIG. 4, computing device 404 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A)÷P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 404 may then calculate a likelihood table by calculating probabilities of different data entries and classification labels. Computing device 404 may utilize a naïve Bayes equation to calculate a posterior probability for each class. A class containing the highest posterior probability is the outcome of prediction. Naïve Bayes classification algorithm May include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, computing device 404 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user data, sensor data 116, user input, or the like as described above as inputs, content 128 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation Field Programmable Gate Array (FPGA), production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
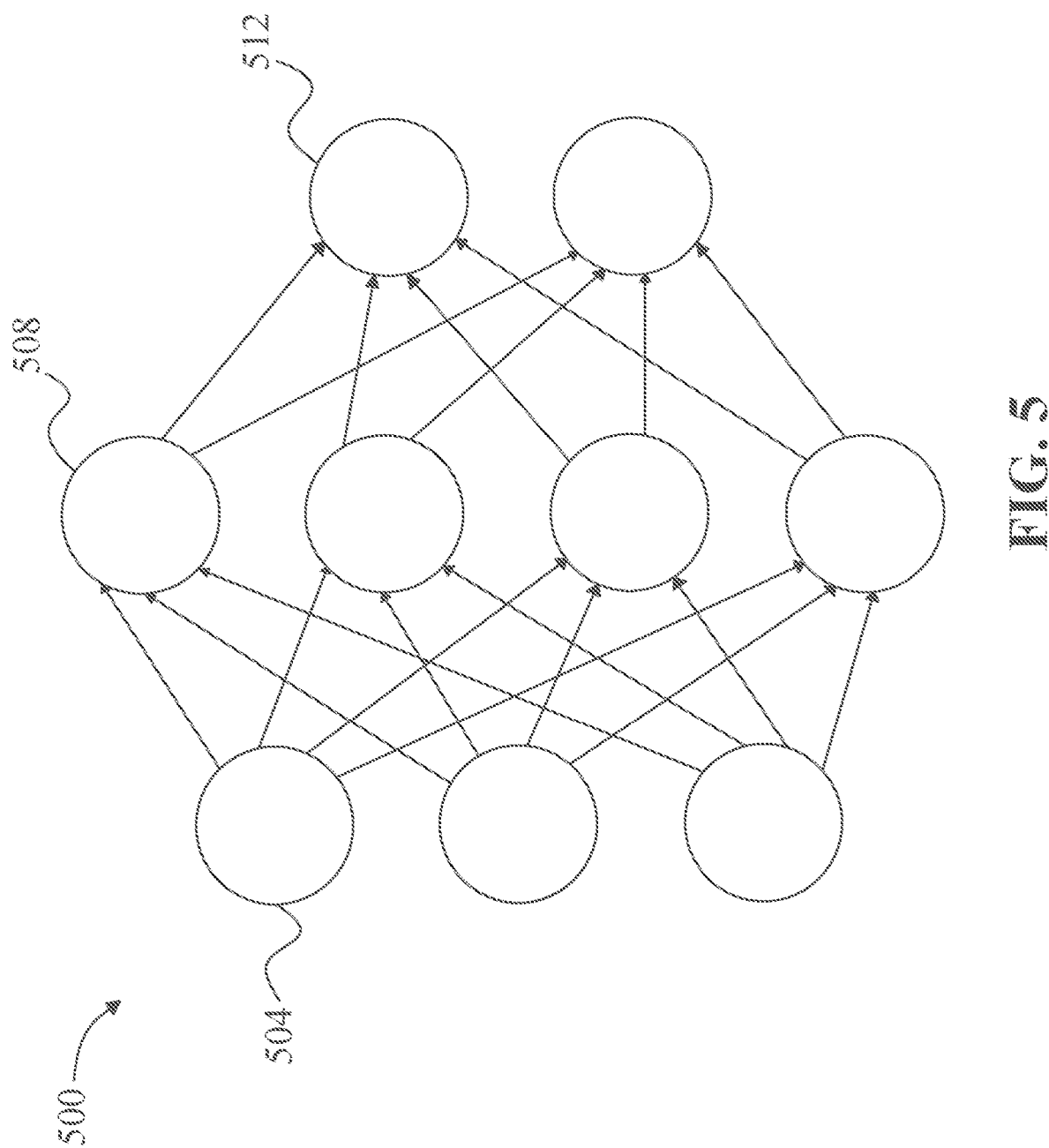
FIG. 5 illustrates a diagram of an exemplary nodal network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
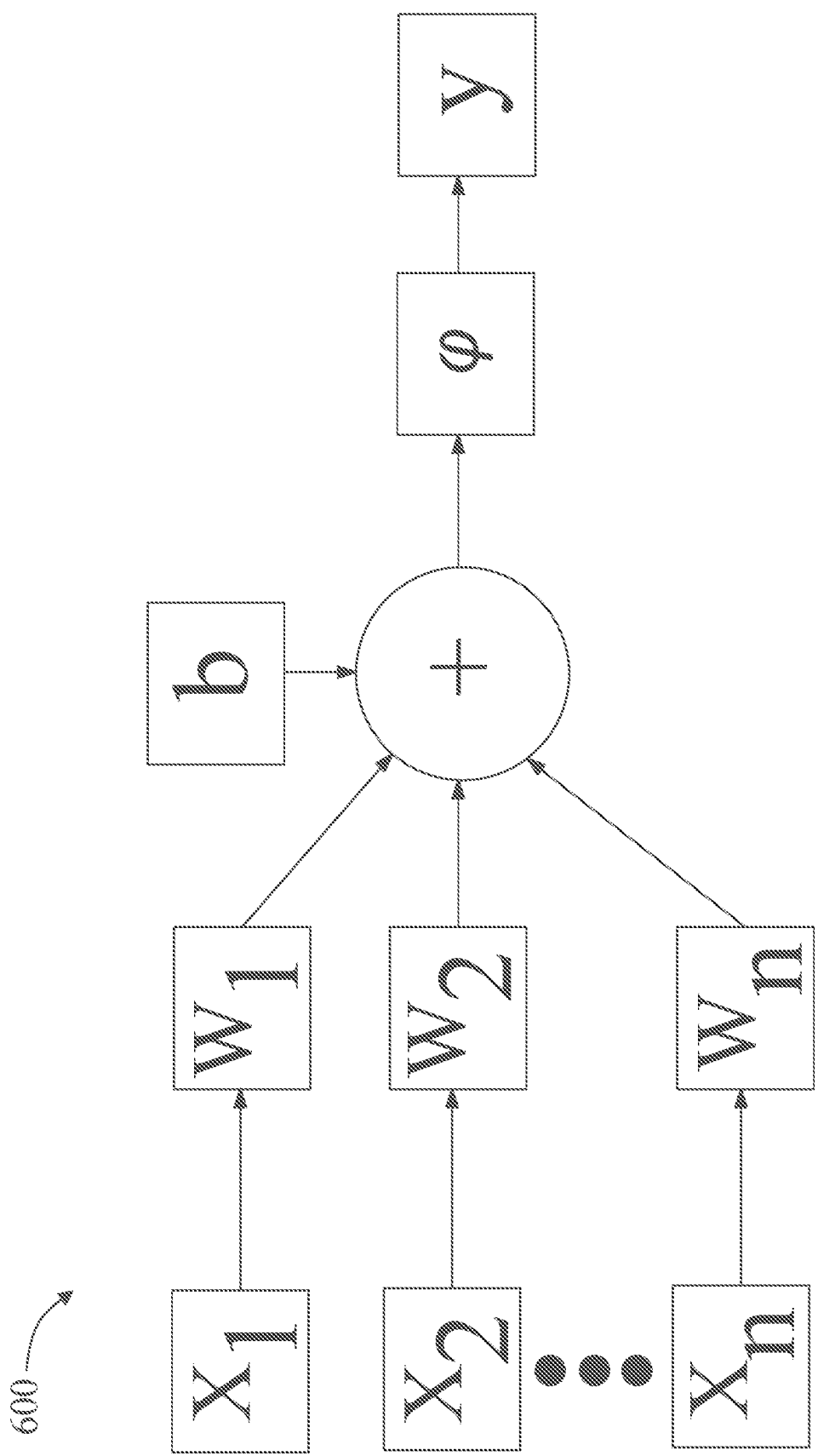
FIG. 6 illustrates a block diagram of an exemplary node.

Referring now to FIG. 6, an exemplary embodiment of a node 600 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*sigmoid(x)$, a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) & \text{for } < 0 \\ x & \text{for } x \le 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
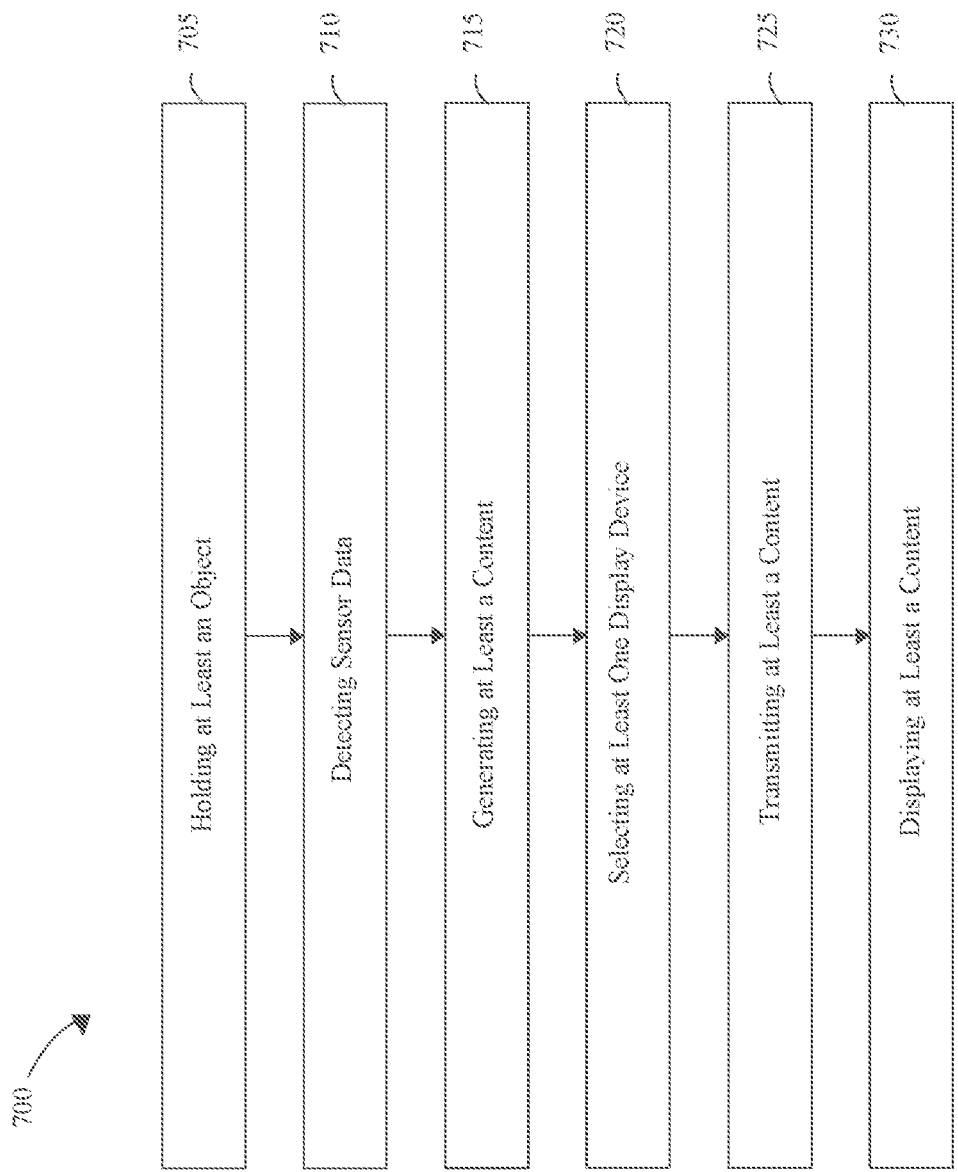
FIG. 7 illustrates a flow diagram of an exemplary method of use of an exemplary interactive object displaying structure.

Referring now to FIG. 7, a flow diagram of an exemplary method 700 of use of interactive object collecting structure is illustrated. Method 700 includes step 705 of holding, using a plurality of object collecting structures, at least an object. These may be implemented with respect to FIGS. 1-6.

With continued reference to FIG. 7, method 700 includes step 710 of detecting, using at least a sensor of a plurality of object collecting structures, sensor data. In some embodiments, the at least a sensor may include a near-field communication reader. In some embodiments, method 700 may further include determining, using the controller a user display device proximity as a function of a proximity datum of the sensor data and a predetermined proximity range. In some embodiments, method 700 may further include determining, using the controller, an absence of the at least an object as a function of an object absence datum of the sensor data. These may be implemented with respect to FIGS. 1-6.

With continued reference to FIG. 7, method 700 includes step 715 of generating, using a controller communicatively connected to at least a sensor, at least a content as a function of sensor data. In some embodiments, method 700 may further include detecting, using an optical sensor of the at least a sensor, image data and generating, using the controller, the at least a content as a function of the image data. In some embodiments, method 700 may further include retrieving, using the controller, object data as a function of an object unique identifier of the sensor data and generating, using the controller, the at least a content as a function of the object data. In some embodiments, method 700 may further include generating, using the controller, content training data, wherein the content training data may include correlations between exemplary object data and exemplary contents, training, using the controller, a content machine-learning model using the content training data and generating, using the controller, the at least a content using the trained content machine-learning model. In some embodiments, method 700 may further include receiving, using the controller, a user input from the at least one display device of the plurality of display devices, updating, using the controller, the content training data as a function of the user input and fine-tuning, using the controller, the at least a content using the content machine-learning model trained with the updated content training data. These may be implemented with respect to FIGS. 1-6.

With continued reference to FIG. 7, method 700 includes step 720 of selecting, using a controller communicatively connected to a plurality of display devices, at least one display device from a plurality of display devices as a function of sensor data. In some embodiments, the plurality of display devices may include a user display device and a structure display device. These may be implemented with respect to FIGS. 1-6.

With continued reference to FIG. 7, method 700 includes step 725 of transmitting, using a controller, at least a content to at least one display device. These may be implemented with respect to FIGS. 1-6.

With continued reference to FIG. 7, method 700 includes step 730 of displaying, using at least one display device, at least a content. In some embodiments, method 700 may further include projecting, using a projector of the plurality of display devices, light onto ground to display the at least a content. These may be implemented with respect to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
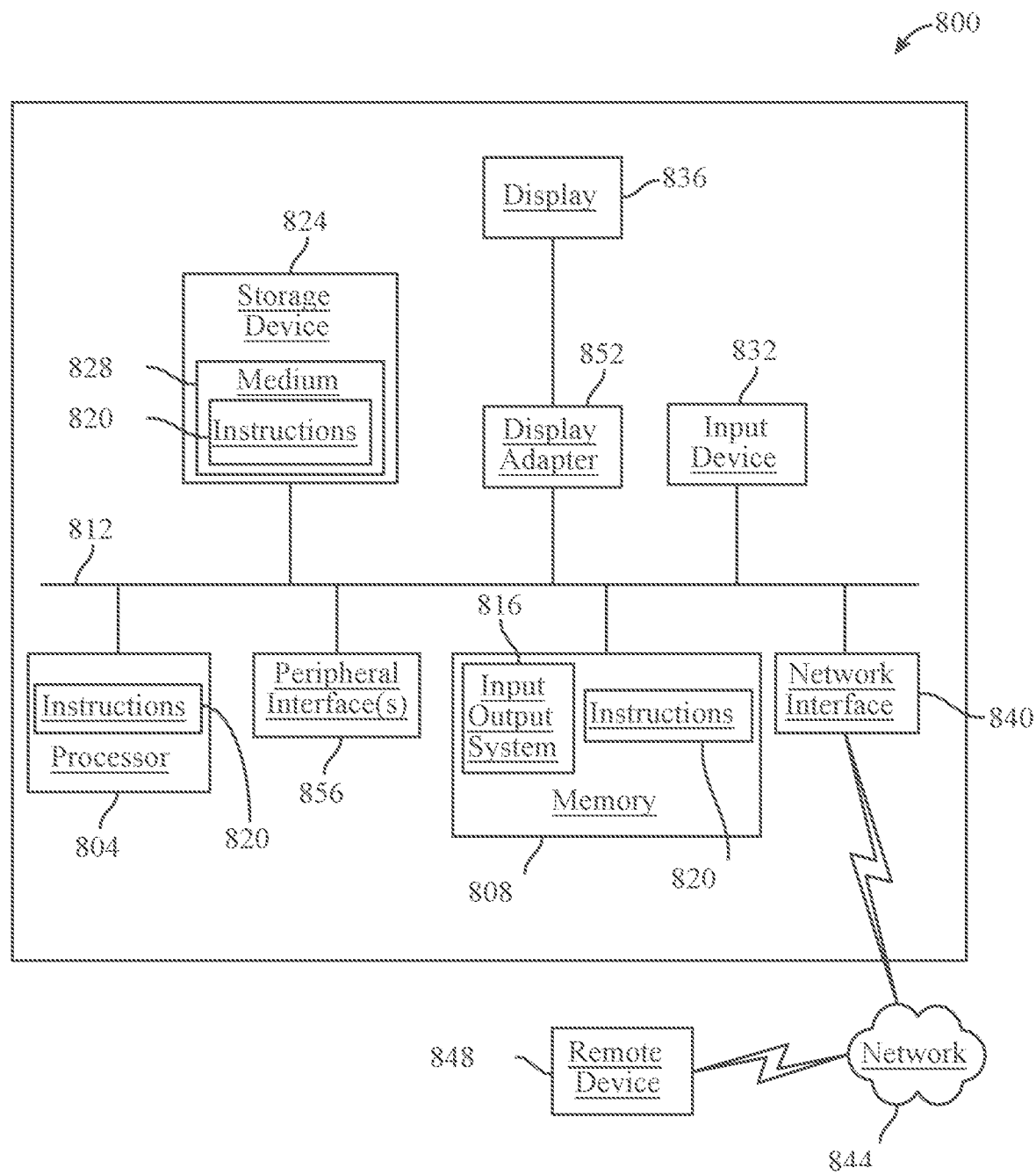
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812. Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and modules according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An interactive object displaying apparatus, the interactive object displaying apparatus comprising:
   a plurality of object collecting structures, wherein:
      the plurality of object collecting structures is configured to hold at least an object; and
      the plurality of object collecting structures comprises at least a sensor, wherein the at least a sensor is configured to detect sensor data;
   a plurality of display devices, wherein the plurality of display devices is configured to display at least a content; and
   a controller communicatively connected to the at least a sensor and the plurality of display devices, wherein the controller is configured to:
      generate content training data, wherein the content training data comprises correlations between exemplary object data and exemplary contents;
      train a content machine-learning model using the content training data;
      generate the at least a content as a function of the trained content machine-learning model and the sensor data;
      select at least one display device from the plurality of display devices as a function of the sensor data; and
      transmit the at least a content to the at least one display device.

2. The apparatus of claim 1, wherein the at least a sensor comprises a near-field communication reader.

3. The apparatus of claim 1, wherein the plurality of display devices comprises a user display device and a structure display device.

4. The apparatus of claim 3, wherein:
   the sensor data comprises a proximity datum; and
   the controller is further configured to determine a user display device proximity as a function of the proximity datum and a predetermined proximity range.

5. The apparatus of claim 1, wherein:
   the sensor data comprises an object absence datum; and
   the controller is further configured to determine an absence of the at least an object as a function of the object absence datum.

6. The apparatus of claim 1, wherein:
   the at least a sensor comprises an optical sensor, wherein the optical sensor is configured to detect image data; and
   the controller is further configured to generate the at least a content as a function of the image data.

7. The apparatus of claim 1, wherein the controller is further configured to:
   retrieve object data as a function of an object unique identifier of the sensor data; and
   generate the at least a content as a function of the object data.

8. The apparatus of claim 1, wherein the controller is further configured to:
   receive a user input from the at least one display device of the plurality of display devices;
   update the content training data as a function of the user input; and
   fine-tune the at least a content using a content generator trained with the updated content training data.

9. The apparatus of claim 1, wherein the plurality of display devices comprises a projector, wherein the projector is configured to project light onto ground to display the at least a content.

10. A method of use of an interactive object displaying structure, the method comprising:
    holding, using a plurality of object collecting structures, at least an object;
    detecting, using at least a sensor of the plurality of object collecting structures, sensor data;
    generating, using a controller, content training data, wherein the content training data comprises correlations between exemplary object data and exemplary contents;
    training, using the controller, a content machine-learning model using the content training data;
    generating, using the controller communicatively connected to the at least a sensor, at least a content as a function of the trained content machine-learning model and the sensor data;
    selecting, using the controller communicatively connected to a plurality of display devices, at least one display device from the plurality of display devices as a function of the sensor data;
    transmitting, using the controller, the at least a content to the at least one display device; and
    displaying, using the at least one display device, the at least a content.

11. The method of claim 10, wherein the at least a sensor comprises a near-field communication reader.

12. The method of claim 10, wherein the plurality of display devices comprises a user display device and a structure display device.

13. The method of claim 12, further comprising:
determining, using the controller a user display device proximity as a function of a proximity datum of the sensor data and a predetermined proximity range.

14. The method of claim 10, further comprising:
determining, using the controller, an absence of the at least an object as a function of an object absence datum of the sensor data.

15. The method of claim 10, further comprising:
detecting, using an optical sensor of the at least a sensor, image data; and
generating, using the controller, the at least a content as a function of the image data.

16. The method of claim 10, further comprising:
retrieving, using the controller, object data as a function of an object unique identifier of the sensor data; and
generating, using the controller, the at least a content as a function of the object data.

17. The method of claim 10, further comprising:
receiving, using the controller, a user input from the at least one display device of the plurality of display devices;
updating, using the controller, the content training data as a function of the user input; and
fine-tuning, using the controller, the at least a content using the content machine-learning model trained with the updated content training data.

18. The method of claim 10, further comprising:
projecting, using a projector of the plurality of display devices, light onto ground to display the at least a content.

* * * * *